United States Patent
Courtois et al.

(10) Patent No.: US 6,697,189 B2
(45) Date of Patent: Feb. 24, 2004

(54) SYSTEM AND METHOD FOR GAIN EQUALIZATION IN AN OPTICAL TRANSMISSION SYSTEM

(75) Inventors: Olivier Courtois, Antony (FR); Vincent Bouder, Paris (FR)

(73) Assignee: Alcatel, Paris (FR)

( * ) Notice: Subject to any disclaimer, the term of this patent is extended or adjusted under 35 U.S.C. 154(b) by 32 days.

(21) Appl. No.: 10/198,347

(22) Filed: Jul. 19, 2002

(65) Prior Publication Data

US 2003/0016439 A1 Jan. 23, 2003

(30) Foreign Application Priority Data

Jul. 20, 2001 (EP) ............................................. 01401963

(51) Int. Cl.⁷ ................................................. H01S 3/00
(52) U.S. Cl. .................................. 359/337.1; 359/337.4
(58) Field of Search ........................... 359/337.1, 337.4, 359/337.5, 334

(56) References Cited

U.S. PATENT DOCUMENTS 5,861,980 A   1/1999  Ono
6,359,726 B1 * 3/2002  Onaka et al. ............. 359/337.1
6,535,330 B1 * 3/2003  Lelic et al. ............. 359/337.13

FOREIGN PATENT DOCUMENTS

EP   0911926 A1   4/1999
EP   1037415 A1   9/2000

OTHER PUBLICATIONS

M. Takeda, et al.: "Active Gain–Tilt Equalization by Preferentially 1.43μm—or 1.48 μm—Pumped Raman Amplification", Fujitsu Laboratories Ltd., Fujitsu Hokkaido Digital Technology Ltd., 1999 Conference "Topical Meeting on Optical Amplifier", pp. 76–79, 1999.

* cited by examiner

Primary Examiner—Mark Hellner
(74) Attorney, Agent, or Firm—Sughrue Mion, PLLC

(57) ABSTRACT

It is disclosed a system for gain equalization in an optical communication system, comprising a fiber link with a two-stage EDFA with an inter-stage access, and in the inter-stage a Dispersion Compensating Fiber, a Raman pump source (RMP) in the contra-propagating way, a Variable Optical Attenuator and a gain flattening filter. The Raman pump is adapted to provide a first gain slope with an opposite trend with respect to the filter and VOA, and is further adapted such that the pump power can be controlled so as to modify the gain slope and get the gain equalization.

11 Claims, 2 Drawing Sheets

SYSTEM AND METHOD FOR GAIN EQUALIZATION IN AN OPTICAL TRANSMISSION SYSTEM

This application is based on and claims the benefit of European Patent Application No. 01401963.2 filed on Jul. 20, 2001 which is incorporated by reference herein.

BACKGROUND OF THE INVENTION

1. Field of the Invention

This invention relates to the field of optical communication technology. More particularly the invention relates to gain equalization in optical transmission systems.

2. Description of the Prior Art

In recent years, optically amplified transmission systems have been developed, in which digital data are transmitted by performing optical amplification and optical relay or repeat using optical transmission fiber. Wavelength division multiplexing (WDM) is used for increasing the capacity of fiber optic networks. In systems using WDM transmission, plural optical signal channels are carried over a single line, thereby each channel being assigned to a particular wavelength. Thereby gain equalization of long haul optical amplified transmissions becomes more and more difficult due to the increasing number of transmitted wavelengths.

A problem of such optically amplified transmission systems is that in each section of such systems extra losses can be induced due to ageing of components. In particular ageing of transmission fiber can lead to significant line losses. Such losses can be compensated by in-line optical amplification, e.g. using erbium doped fiber amplifiers (EDFA). The optical amplifier gain is increased according to the extra losses of the section. This extra amplifier gain however induces a strong gain distortion of the EDFA over the wavelength range. This gain distortion is in fact linear in dB versus wavelength and is about 0.2 dB per amplifier over 12 nm for a 1 dB gain change.

This gain distortion induces a degradation of the transmission that can be drastic for very long haul systems, e.g. for systems comprising more than one hundred repeaters.

Another problem of state-of-the-art optical transmission systems is the fact that the loss of a fiber span is not exactly known when cable and repeaters are assembled. Generally an EDFA is designed in function of it's nominal expected gain. This nominal gain is calculated with an assumption of the span loss of the fiber cable, which is manufactured in parallel with the EDFAs.

Due to the fiber attenuation variation and depending on certain parameters during the manufacturing process, the actual loss of manufactured cable is somewhat different from the expected loss. Therefore, the real gain of the EDFAs can be lower or higher than the expected one, thus inducing a linear tilt in dB versus wavelength. This tilt is negative or positive, depending on whether the EDFA gain is higher or lower than the gain used to design the EDFA. Therefore, the optimization of the overall link can be carried out only after the assembly of the cable and the repeaters, that is just before the laying, and thus too late to introduce adapted gain flattening filters.

In addition, in the terrestrial links, EDFAs are composed of two stages and allow a mid-stage access. This mid-stage access is often used for inserting a Dispersion Compensating Fiber (DCF) to compensate for chromatic dispersion accumulated along the previous section. These amplifiers are designed to have a flat spectral gain in dB for a certain gain and a certain mid-stage. But in the real system, those amplifiers are rarely used at their nominal functional point and the gain is never flat. A further problem is therefore to find a way to compensate for this unflatness.

To try to solve the above problems and compensate for the gain tilt, it is already known to provide pumped Raman amplification, as described by Fuiitsu in the paper "Active Gain Tilt Equalization by 1.43 or 1.48 $\mu$m pumped Raman amplification" at the conference "Topical meeting on optical amplifier" in 1999.

This solution uses the fact that the Raman gain variation versus wavelength depends on the Raman pump wavelength. While a 1480 nm pump provides a Raman gain with positive slope, with a 1430 nm pump a Raman gain with negative slope is obtained. The amount of gain tilt is then adjusted by changing the Raman pump power. The disadvantages of this solution are the following: The Raman gain is not linear in dB versus wavelength over 25 nm (1535–1560 nm) for a pumping wavelength of 1430 nm. Therefore the gain equalization cannot be carried out on a wide optical bandwidth, but is limited to only 15 nm.

SUMMARY OF THE INVENTION

Therefore in view of the known solutions, that are not quite efficient, it is the main object of the present invention to provide an improved gain equalization system and method for use in optical communication systems which solves the above problems.

According to the invention a system for gain equalization in an optical communication system is provided.

The optical communication system comprises a fiber link with a two-stage EDFA with an inter-stage access, and in the inter-stage:

a Dispersion Compensating Fiber;

a Raman pump source in the contra-propagating way;

a Variable Optical Attenuator VOA; and a gain flattening filter.

The Raman pump is adapted to provide a first gain slope with an opposite trend with respect to the filter and VOA, and is further adapted such that the pump power can be controlled so as to modify the gain slope.

Furthermore a method for gain equalization in an optical communication system is provided. The method comprises the steps of:

providing in the interstage of a two-stage EDFA:
  a Dispersion Compensating Fiber;
  a first gain slope by means of a Raman pump connected to the DCF fiber;
  a second gain slope by means of a Variable Optical Attenuator (VOA) and a gain flattening filter coupled to the DCF fiber, and controlling the gain equalization by changing the pump power of the Raman pump and the attenuation of the VOA.

Thereby, with a combined use of the VOA, the pump power and a little adaptation of the EDFA gain by the flattening filter, the EDFA gain can be maintained flat for a desirable range of input power.

These and further objects are achieved by means of an improved gain equalization system and method for use in optical communication systems as described in the attached claims, which are considered an integral part of the present description.

With this solution no impact on the Noise Figure is achieved as the VOA is increased at the same time as the raman gain increases. Therefore, the EDFA stands flat with no penalty on the Noise Figure. Moreover, this new solution does not add penalties due to the non-linear effects in the DCF fiber.

Furthermore this solution has the advantage to rely on technologies particularly feasible for terrestrial transmission. Another advantage of such systems is the possibility to modify the overall gain response from a remote terminal station when the link is installed. Since the degradation of the transmission due to ageing can be drastic for very long haul systems, it is most advantageous to use the present invention in such systems.

The invention will be described in detail in the following description of preferred embodiments with reference to the following figures, given by way of non-limiting example to illustrate the principles of the invention.

BEST MODE FOR CARRYING OUT THE INVENTION

Figure 1:
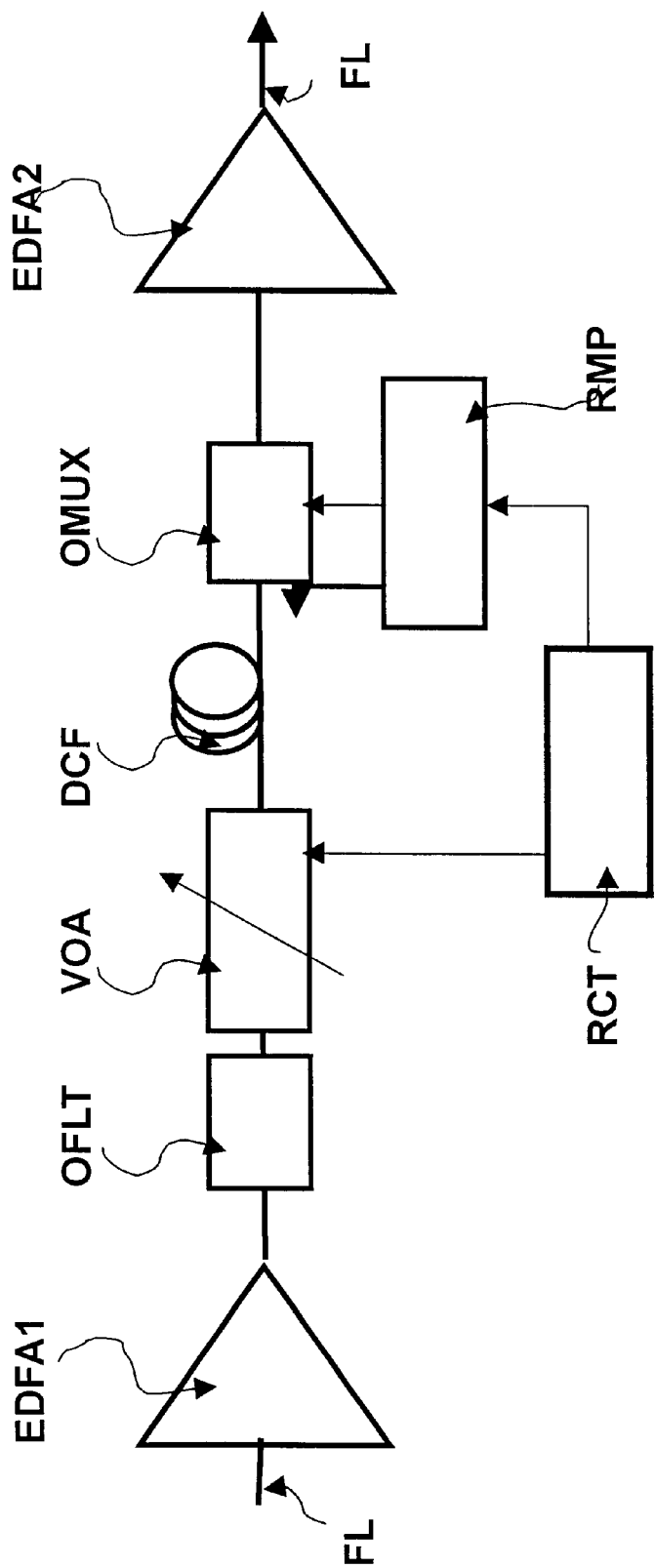
FIG. 1 is a a schematic view showing a preferred embodiment of the present invention.

A preferred embodiment of the present invention is shown in FIG. 1. In an optically amplified transmission system a double stage EDFA amplifier is provided, EDFA1 and EDFA2 with inter-stage access possibility, e.g. to compensate losses in the fiber link FL.

Preferably an EDFA with standard configuration, comprising a piece of Erbium doped fiber pumped by a semiconductor laser with a preferred wavelength at 1480 nm (to have a good power level) or 980 nm (to have a good noise figure) is used. The light of this pump is launched into the fiber through an optical multiplexer which also feeds the amplified signal at 1555 nm to the fiber.

In between the two EDFA stages a Dispersion Compensating fiber DCF is provided, thereby the Raman efficiency is three times larger than in a standard fiber.

Further a Raman pump RMP is provided. The wavelength of the Raman pump is selected in accordance with the specific characteristics and operating requirements of the transmission system. In a prefered embodiment, in which the wavelength channels are in the wavelength range between 1529 nm and 1561 nm, a pump source wavelength of 1462 nm is employed, since it provides maximum gain over the wavelength range.

The Raman pump RMP preferably employs a standard semiconductor laser as used in the EDFA with a wavelength at 1462 nm. In a preferred embodiment of the invention the Raman pump is controlled from a remote control RCT, e.g. a terminal station.

The Raman pump RMP is connected to the fiber DCF via an optical multiplexer OMUX, wherein the modulated channels are time division multiplexed and launched onto the fiber DCF.

In a preferred embodiment a known fiber fused multiplexer or multiplexer which use the bulk optics technology are employed.

Furthermore a fixed linear gain flattening optical filter OFLT with negative slope is provided, which is coupled into the fiber DCF.

It is preferred to use a fixed filter with linear negative slope over a wide spectral range. Thereby preferably filters of known type based on the Fiber Bragg Grating technology, e.g. manufactured by Alcatel, are employed. However, any fixed opticallinear filter can be used.

A Variable Optical Attenuator VOA of a known type is inserted after the filter OFLT. Preferably the VOA attenuation is controlled from the remote control RCT. Preferred indicative values for VOA attenuation range typically between 2 and 8 dB.

The slope of the Raman gain can be tuned by changing the power of Raman pump RMP.

When combined with the filter OFLT and variable attenuator VOA with negative slope, the whole provides the functionality of a tunable linear filter. At nominal pump power, the Raman gain shape is opposite to the filter response. Therefore, increasing the pump power induces a positive tilt and reducing the pump power induces a negative tilt.

This functionality is independent of the EDFA characteristics and can be controlled remotely.

Figure 2:
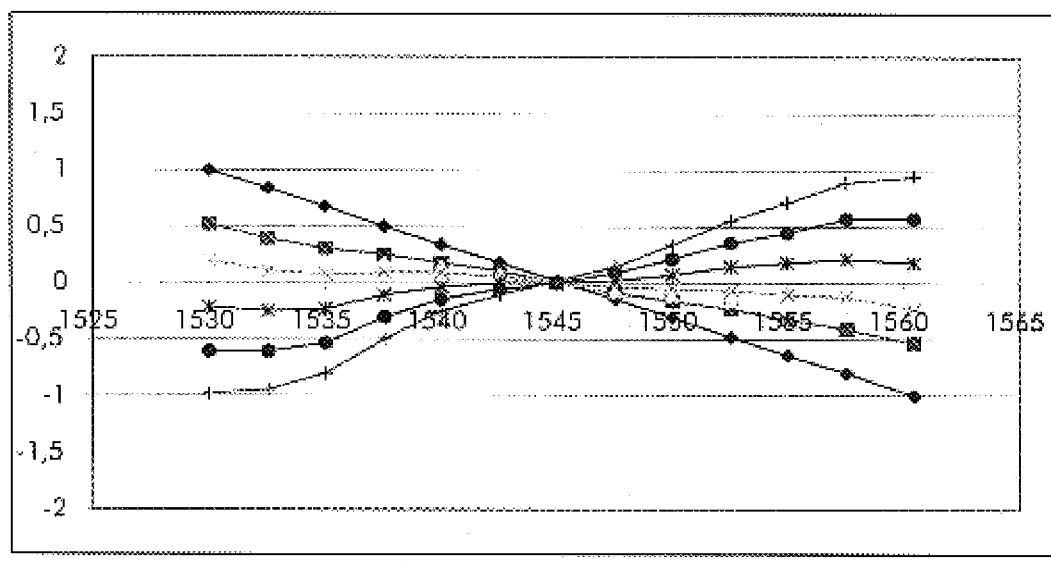
FIG. 2 is a graphical plot depicting measured tilt compensation vs. wavelength for different Raman pump power.

With the combined use of the VOA, the pump power and the little change of the EDFA Gain Flatenning Filter, the potential achievable slopes are shown in FIG. 2. That means that the EDFA gain can be kept flat for a range of input power of about 7 dB.

By this system the tilt can be compensated in a range between −2 and +2 dB, and the total noise figure is improved by 0.8 dB. Therefore the maximum link distance can be increased by typically 20%.

In addition, changing the pump power induces a change of the input power of the EDFA following the Raman gain stage. This in turn induces a gain tilt of this EDFA with the same slope as the Raman gain tilt.

There has thus been shown and described a novel system and a novel method for gain equalization in an optical transmission system which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. A system for gain equalization in an optical communication system comprising a fiber link and optical amplifiers connected to the fiber link, wherein the gain equalization system comprises:

a two-stage optical amplifier with an inter-stage access and, in the inter-stage:
a Dispersion Compensating Fiber;
a Raman pump connected to the fiber link, the Raman pump providing a first gain slope, the Raman pump further providing a pump power that can be controlled in order to modify said gain slope; and
a gain flattening optical filter at a first stage output of two-stage erbium doped fiber amplifier; and a Variable Optical Attenuator providing a second gain slope.

2. The gain equalization system according to claim 1, wherein said first gain slope has a first trend and said second gain slope has a second trend, the first trend being opposite with respect to said second trend, so as to get said gain equalization.

3. The gain equalization system according to claim 1 further comprising an optical multiplexer, the Raman pump being connected to the Dispersion Compensating Fiber through said optical multiplexer.

4. The gain equalization system according to claim 1, wherein the Raman pump provides an output power and the Variable Optical Attenuator provides an attenuation, both the Raman pump output power and the Variable Optical Attenuator attenuation being remotely controlled.

5. The gain equalization system according to claim 1, wherein the two-stage optical amplifier is an Erbium Doped Fiber Amplifier.

6. The gain equalization system according to claim 1, wherein the optical communication system is a wavelength division multiplexing system.

7. An optical communication system comprising a fiber link and optical amplifiers connected to the fiber link, wherein the optical communication system further comprises a system for gain equalization comprising:
  a two-stage optical amplifier with an inter-stage access and, in the inter-stage:
    a Dispersion Compensating Fiber;
    a Raman pump connected to the fiber link, the Raman pump providing a first gain slope, the Raman pump further providing a pump power that can be controlled in order to modify said gain slope; and
    a gain flattening optical filter at a first stage output of two-stage erbium doped fiber amplifier; and
  a Variable Optical Attenuator providing a second gain slope.

8. A method for gain equalization in an optical communication system comprising a fiber link and optical amplifiers connected to the fiber link, the method comprising the steps of:
  providing a two-stage optical amplification with an inter-stage access and a Dispersion Compensating Fiber in the inter-stage;
  providing a first gain slope by means of a Raman pump in said inter-stage;
  providing a second gain slope by means of a Variable Optical Attenuator and a gain flattening filter coupled to the fiber in said inter-stage; and
  controlling the gain equalization by changing the pump power of the Raman pump and the attenuation of the Variable Optical Attenuator.

9. The method according to claim 8, wherein the step of providing a first gain slope comprises providing a first gain slope having an opposite trend with respect to said second gain slope, so as to get said gain equalization.

10. The method according to claim 8, further comprising a step of connecting the Raman pump in the inter-stage by optical multiplexing.

11. The method according to claim 8 further comprising the steps of changing the pump power of the Raman pump and changing the attenuation of the Variable Optical Attenuator, wherein said changing steps are remotely controlled.

* * * * *